Oct. 19, 1965  F. P. BUNDY  3,212,852
METHOD FOR CONVERTING HEXAGONAL BORON NITRIDE TO A NEW STRUCTURE
Filed July 30, 1962  2 Sheets-Sheet 1
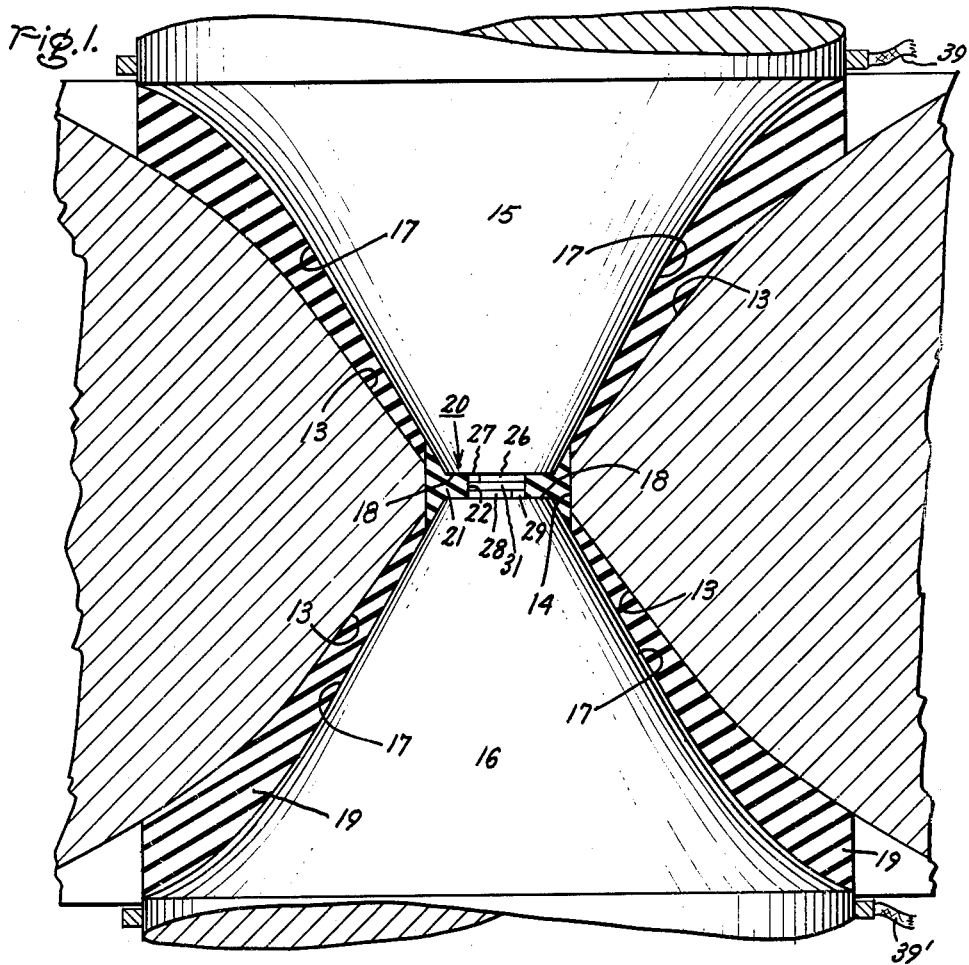
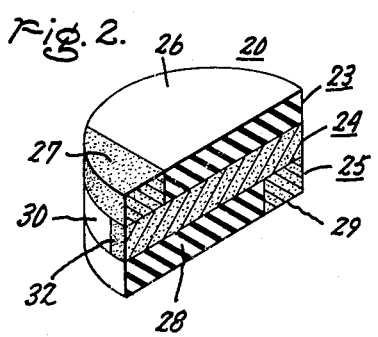
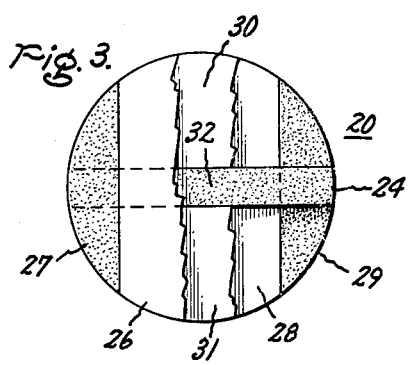
Inventor:
Francis P. Bundy,
by James J. Lichiello
His Attorney.

Oct. 19, 1965   F. P. BUNDY   3,212,852
METHOD FOR CONVERTING HEXAGONAL BORON NITRIDE TO A NEW STRUCTURE
Filed July 30, 1962   2 Sheets-Sheet 2
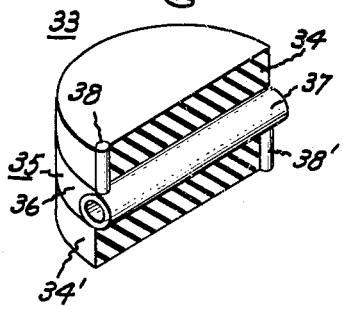
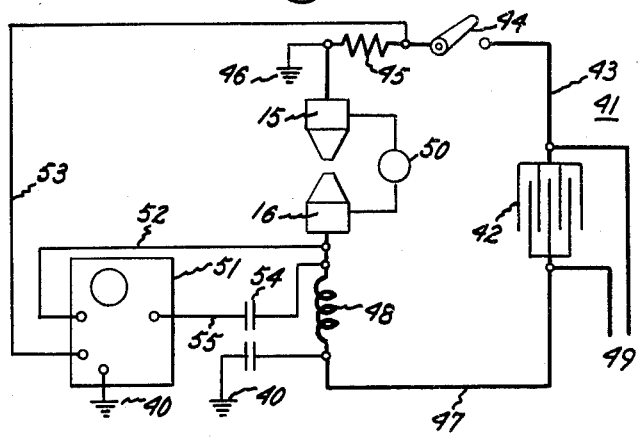
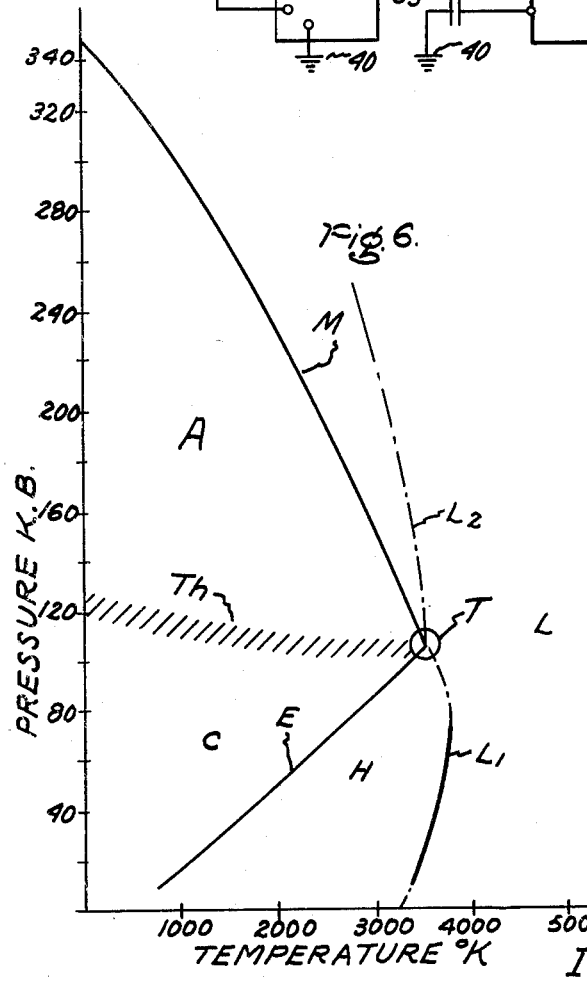
Inventor:
Francis P. Bundy,
by James J. Lickiello
His Attorney.

United States Patent Office

3,212,852
Patented Oct. 19, 1965

3,212,852
METHOD FOR CONVERTING HEXAGONAL BORON NITRIDE TO A NEW STRUCTURE
Francis P. Bundy, Scotia, N.Y., assignor to General Electric Company, a corporation of New York
Filed July 30, 1962, Ser. No. 218,800
3 Claims. (Cl. 23—191)

This invention relates to the cubic form of boron nitride and its formation or transformation from the hexagonal form of boron nitride. More particularly, this invention in one form relates to a more direct process at higher pressures of converting hexagonal boron nitride to cubic boron nitride in the absence of a catalyst. This application is a continuation in part of application S.N. 191,913—Bundy, filed May 2, 1962, now abandoned and assigned to the same assignee as the present invention.

Prior production of the cubic form of boron nitride in a reaction process generally includes the subjection of a hexagonal form of boron nitride in the presence of or together with a specific additive material to very high pressures and temperatures in the cubic boron nitride stable region of boron nitride on the phase diagram of boron nitride. After removal of the high pressure high temperature condition, cubic boron nitride is recovered. The specific added material or catalyst is described as including at least one material selected from the class consisting of alkali metals, alkaline earth metals, tin, lead, antimony, and nitrides of the foregoing metals. The cubic boron nitride stable region is that generally described region above the hexagonal boron nitride-cubic boron nitride equilibrium line on a phase diagram of boron nitride.

An apparatus and a method utilized to provide cubic boron nitride is disclosed in U.S. Patent 2,947,617, Wentorf. Briefly, the apparatus as described in U.S. Patent 2,947,617, together with the cross reference to U.S. Patent 2,941,248, Hall, includes an annular belt or die member having a convergent divergent aperture therethrough, and a pair of oppositely positioned concentric frustoconical punches which move into the said aperture to define a reaction chamber therein. A ceramic or stone material gasket such as pyrophyllite, is employed between the punches and the die member for sealing purposes.

A method of providing cubic boron nitride as described in U.S. Patent 2,947,617 utilizes a pyrophyllite reaction vessel containing reactive materials, for example hexagonal boron nitride, and one of the above-mentioned additives. The reaction vessel is placed in the described reaction chamber and motion of the punches towards each other compresses and raises pressure in the vessel. By connecting the punch members to a source of electrical power, a resistance circuit is provided through the punches and through a heater element in the reactor materials in the reaction vessel for resistance heating. Pressure and temperature are adjusted to provide reaction conditions above the hexagonal boron nitride-cubic boron nitride equilibrium line on a phase diagram of boron nitride. After reduction of pressures and temperature, cubic boron nitride is recovered from the reaction vessel.

There are certain limitations to the foregoing method and apparatus which affect the described reaction. One limitation relates to temperature. High temperatures substantially weaken the apparatus and represent a critical feature and limitation towards obtaining higher pressures. Much higher pressures may be reached in the absence of high temperatures than with high temperatures. High temperatures also cause melting, chemical reactions and/or decomposition of surrounding materials, products of which progress into and deleteriously affect the reaction. At the same time, high temperatures in the surrounding materials, because of melting, decomposition and phase changes, lead to both undesirable temperature and pressure fluctuations in the apparatus.

Another limitation concerns the aforementioned required additives. These additives occupy a considerable physical volume of the reaction vessel which lessens the amount of cubic boron nitride crystals which are produced in a given reaction. Furthermore, the additives may also undergo undesirable chemical reactions, or contain both known and unknown constituents or impurities which affect the reaction. In many instances the effect of these impurities is deleterious or unknown. Since an additive may be generally molten over a relatively long period of time, the progress or diffusion of impurities also acts over a longer period of time to affect the reaction. The growth or transformation of cubic boron nitride from the reaction utilizing a molten additive also requires varying practices because of the many melting points associated with the many additives and compounds of these additives that may be employed. By the same token, the end product or result is also different for the different additives employed, because of for example, inclusion of metals or metallic compounds in the resultant crystal.

The combined effect of the required temperatures and added materials not only prevents reaching of higher pressures for more favorable reactions, but also considerably detracts from the predetermination of particular characteristics of the cubic boron nitride crystal which is the end product. Additionally, these limitations affect the desired control over the reaction process. Since these limitations are restrictive to higher pressures, they are also restrictive to control whereby specific areas or ranges of operation may be obtained.

Accordingly it is an object of this invention to provide an improved method for the conversion of hexagonal boron nitride to cubic boron nitride.

It is a further object of this invention to minimize high temperature conditions in the conversion of hexagonal boron nitride to cubic boron nitride.

It is another object of this invention to eliminate the prior required additives in producing cubic boron nitride.

It is yet another object of this invention to predetermine favorable cubic boron nitride characteristics in producing cubic boron nitride.

It is another object of this invention to provide a more favorable cubic boron nitride reaction process at higher pressures.

It is yet another object of this invention to provide an increase in the physical volume available for a cubic boron nitride process in reaction vessels.

Briefly described, this invention includes the subjection of a hexagonal form of boron nitride in the absence of a catalyst to high pressures, and preferably also to high temperatures so that the hexagonal form of boron nitride is transformed or converted to the cubic form of boron nitride. More specifically, this invention includes the subjection of the hexagonal form of boron nitride to a specified pressure range above the hexagonal to cubic boron nitride equilibrium line on a phase diagram of boron nitride and to high temperatures to transform or convert the hexagonal form of boron nitride to the cubic form of boron nitride.

This invention will be better understood when taken in connection with the following description and figures in which:

FIG. 1 is an elevational view of a modified belt apparatus as employed to practice this invention;

FIG. 2 is a cross sectional view of a reaction vessel in FIG. 1 with a sample contained therein;

FIG. 3 is a top cutaway view of the component parts of the reaction vessel of FIGS. 1 and 2, in their operative relationship;

FIG. 4 is a modification of the reaction vessel of FIG. 2;

FIG. 5 is a schematic illustration of a capacitor type circuit employed for resistance or flash heating; and FIG. 6 is a graph illustrating the phase diagram of boron nitride.

The starting material for the practice of this invention includes generally a source of boron and a source of nitrogen. Such a source may be certain materials or compounds which contain one or both, boron and nitrogen, and which, under the reaction conditions react, decompose, or otherwise provide boron and nitrogen. A preferred starting material is the solid form of boron nitride. This material is commercially available as a relatively pure white powder 99.8+percent pure, and in molded form approximately 97% boron and 2.45% $B_2O_3$. It is a white slippery solid material of a density of about 2.25 grams/cm.$^3$. Its crystal structure is similar to graphite with stacked sheets of 6 membered rings, and in each ring B and N atoms alternate. This type of hexagonal boron nitride is preferable as a starting material because of its crystal structure, known constituents, and the absence of other materials which may cause different reactions. Reference is made to U.S. Patent 2,947,617 for a more complete description of starting materials.

The term "conversion" is employed generically to denote the change or changes which occur in a hexagonal form of boron nitride to cubic form of boron nitride conversion reaction wherein the crystal structure of the hexagonal form of boron nitride is caused to change directly to a cubic form of boron nitride crystal structure without the need of an intermediary material to facilitate the process.

As one operative example, the apparatus employed in this invention is a modified form of the belt apparatus as disclosed in U.S. Patent 2,941,248, Hall. This modification is illustrated in proper proportion in FIG. 1. Referring now to FIG. 1, apparatus 10 includes an annular die member 11 having a convergent divergent aperture 12 therethrough and surrounded by a plurality of hard steel binding rings (not shown) as is well known in the art for support purposes. One satisfactory material for die member 11 is Carboloy cemented carbide grade 55A. Modification of the die member 11 in this invention includes tapered surfaces 13 having an angle of taper of about 52.2° with the horizontal and a generally right circular cylindrical chamber 14 of about 0.200 in. in diameter.

A pair of tapered or frustoconical punches 15 and 16 of about 1.0 in. O.D. are oppositely positioned with respect to each other and concentric with aperture 12 and to define a reaction chamber therewith. These punches 15 and 16 are Carboloy cemented carbide grade 883 and utilize a plurality of hard steel binding rings (not shown) for support purposes. Modification of the punches includes elongated tapering flank surfaces 17, of a 60° included angle, tapering to provide face 18 of about 0.150 in. in diameter with the entire tapering portion being about 0.560 in. in axial length. The combination of the 60° included angle of the punches and the 52.2° of the tapered surface 13 of the die member 11 provide a wedge shaped gasket opening therebetween.

A further modification of this invention relates to sealing means. Sealing or gasketing is provided by means of single gaskets 19 of for example pyrophyllite. Gaskets 19 between the punches 15 and 16 and die member 11 are wedge shaped to fit the defined space and of sufficient thickness to establish a distance of about 0.060 inch between punch faces 19.

The essential features incorporated by the modifications which provide the apparatus with a capability of reaching very high pressures in the range of 100 to 200 kilobars and in excess of 200 kilobars, relate to ratios of certain given dimensions. These dimensions are (1) the diameter of the punch face portion 18 (2) the distance between the punch face portions 18 in the initial position as illustrated in FIG. 1, before compression, and (3) the slant height of the the gasket 19 along the flank or tapered portion 17 of the punches. In operative working examples of the apparatus of this invention, the ratio of the gap, G, or distance between punch faces 18, to the diameter, D, of the face portion 18, is less than about 2.0, preferably below about 1.75. The slant length, L, of gasket 19 as predicated upon the diameter of the face portion 19 is 6 times D, $L/D=6$. These values are compared to those of U.S. Patent 2,941,248—Hall, which are generally $G/D=2.0$ and $L/D$ is less than about 1. These preferred ratios provide a greater amount of lateral support for the punches 15 and 16 without extensively increasing the required component of applied force necessary to compress the gasket for pressure rise in the reaction vessel. These ratios are further applicable to other punch type apparatus to increase their pressure range.

A reaction vessel 20 is positioned between the punch faces 18. As one specific example, reaction vessel 20 includes a cylindrical or spool shaped pyrophyllite sample holder 21 having a central aperture 22 therethrough. The parts to be positioned in aperture 22 in their operative relationship are more clearly illustrated in FIG. 2 without sample holder 21. Reaction vessel 20 includes both the sample material and its heating means in the form of a solid right circular cylinder comprising three concentrically adjacent disc assemblies 23, 24, and 25. Disc assembly 23 includes a larger (¾) segmental portion 26 of a sample material such as boron nitride and a smaller (¼) segmental portion 27 of an electrically conductive material, for example graphite. Disc assembly 25 also includes a larger (¾) segmental portion 28 of boron nitride and a smaller (¼) segmental portion 29 of graphite. The intermediate disc assembly 24 comprises a pair of spaced part boron nitride segments 30 and 31 (not shown) and a graphite bar 32 therebetween. Each disc assembly is 0.080 in. in diameter and 0.020 inch thick. Graphite bar 32 is 0.080 in. long by 0.025 in. in width and 0.020 in. in height. The illustrated configuration provides a graphite heater surrounded by a sample of boron nitride where current flow through the graphite heats the boron nitride. Heater 32 may be a mixture of boron nitride with graphite, metals, etc. FIG. 3 is a top cutaway view showing the different parts in operative relationship.

A modified reaction vessel 33 is illustrated in FIG. 4. In FIG. 4, a sample holder 21 (not shown), includes a pair of pyrophyllite disc members 34 and 34' of about 0.080 in. diameter and about 0.017 in. thick positioned concentrically one on each side of disc assembly 35. Disc assembly 35 includes a pair of segments 36 and 36' (not shown) in spaced apart relationship to receive a metal tube 37 therebetween. Segments 36 and 36' are about 0.080 in. diameter and about 0.025 in. thick, while tube 37 is titanium of 0.030 in. O.D., 0.025 in. I.D., and 0.080 in. length. Tube 37 contains the sample material to be utilized, for example, hexagonal boron nitride, and is slightly flattened to be about 0.026 in. thick.

In order to provide for the conduction of electrical current into the reaction vessel, electrodes are provided in the form of stainless steel wires 38 and 38' of about 0.020 in. diameter. These wires are positioned at each end of tube 37, one of which, 38, leads upwardly to contact punch 15 and the other, 38', which leads downwardly from the other end of tube 37 to contact punch 16. The positioning of wires or electrodes 38 and 38' is accomplished by drilling a hole, of about the diameter of electrodes 38 and 38', closely adjacent the periphery of discs 34 and 34' and inserting the electrodes therein.

Electrical resistance heating for the reaction vessels of

FIGS. 2 and 4 is obtained by connecting punches 15 and 16 to a source of power (not shown) by means of conductors 39 and 39'. Current flow is from one punch, for example 15, through the reaction vessel as described and to punch 16. In FIG. 2, the current path in the reaction vessel is from one graphite segment 27 through the graphite bar 32 as a resistance element and then through segment 29. In FIG. 4, the current path in the reaction vessel is from one wire electrode 38 through tube 37 as a resistance heater and then through wire electrode 38'. Various other reaction vessels, modifications, and configurations as known in the art may also be employed in this invention.

Apparatus 10 as described provides a desired pressure in a region where cubic form of boron nitride is stable and where boron nitride prefers to exist in the cubic rather than hexagonal form. Operation of apparatus 10 includes placing the apparatus, as illustrated, between the platens of a suitable press and causing punches 15 and 16 to move towards each other thus compressing the reaction vessel and subjecting the sample material therein to high pressure. To calibrate the apparatus for high pressures, the calibration technique as given in aforementioned U.S. Patents 2,947,610 and 2,941,248 may be employed. This technique includes the subjection of certain metals to known pressures where an electrical phase transition of these materials is indicated. For example, during the compression of iron a definite reversible electrical resistance change is noted at about 130 kilobars. Therefore, an electrical resistance change in iron denotes 130 kilobars pressure.

The following table is indicative of the metals in the calibration of the belt apparatus as desired:

*Table 1*

| Metal: | Transition pressure, (kilobars) |
| --- | --- |
| Bismuth I[1] | 25 |
| Thallium | 37 |
| Cesium | 42 |
| Barium I[1] | 59 |
| Bismuth III[1] | 89 |
| Iron | 130 |
| Barium II | 141 |
| Lead | 161 |
| Rubidium | 193 |

[1] Since some metals indicate several transitions with increasing pressure, the Roman numerals indicate the transition utilized, in sequential order.

A more particular description of methods employed to determine the above transistion values may be found in the publication of F. P. Bundy, Calibration Techniques in Ultra High Pressures, Journal of Engineering for Industry, May 1961; Transactions of the ASME, Series B, and P. W. Bridgman, Proceedings of the American Academy of Arts and Science, Vol. 74, Page 425, 1942, Vol. 76, Page 1, 1945, and Vol. 76, Page 55, 1948. The Bridgman values were later corrected to their present values as given in the above table. See R. A. Fitch, T. E. Slykhouse, H. G. Drickamer, Journal of Optical Society of America, Vol. 47, No. 11, Pages 1015–1017, Nov. 1957, and A. S. Balchan and H. G. Drickamer, Review of Scientific Instruments, Vol. 32, No. 3, Pages 308–313, March 1961. By utilizing the electrical resistance changes of the metals as given, a press is suitably calibrated to provide correct readings for the approximate pressure within the reaction vessel.

Temperature is increased in the reaction vessels as described by various means such as for example, ordinary slow resistance type heating as is well known, by capacitor circuit discharge, or a thermite reaction, etc. The more common methods of raising the temperature are, slow resistance heating, one example being similar to the circuitry and method described in U.S. Patent 2,947,610, and capacitor discharge heating which is employed for rapid heating. A capacitor circuit 41 employed for discharging current through sample 32 or tube 37 is best described with respect to FIG. 5. Generally speaking, the circuit is a capacitor discharging circuit which discharges current through apparatus 10, as has been described, with oscilloscope and resistance readings being taken for voltage current and resistance of the sample. In FIG. 5, circuit 41 includes a bank of electrolytic capacitors having a capacity of about 85,000 microfarads and illustrated as capacitor 42. Capacitor 42 is capable of being charged up to about 120 volts. Lead 43 connects one side of capacitor 42 to upper punch 15, through switch 44 and a noninductive current resistor 45 of 0.00193 ohm. Resistor 45 includes ground connection 46. The other side of capacitor 42 is connected by means of lead 47 to punch 16 through an inductance choke coil 48 of 25 microhenries and 0.0058 ohm resistance. Capacitor 42 is charged from a suitable source of power 49 (not shown). It can thus be understood that after charging capacitor 42, switch 44 may be closed to discharge current through sample 32 in reaction vessel 20. Thermodynamic calculations with respect to cold graphie surrounded by such materials as pyrophyllite, magnesium oxide (MgO) and boron nitride (BN), and based on ordinary values of thermal conductivity and heat capacity, indicate a cool off period to half temperature at the center of a graphite sample in the reaction vessel of FIG. 2 in about 0.015 second. The described electrical circuit provides injection of the required heating energy in about 0.001 to 0.004 second. A Kelvin bridge resistance meter 50 is connected to top punch 15 and bottom punch 16 to measure the resistance through tube 37 or heater 32 to indicate melting or other conductive characteristics.

For a graphic illustration of voltage and current through heater 24, circuit 41 therefore includes a Tektronix 535A oscilloscope 51 connected by lead 52 as the E, voltage signal to bottom punch 16, and by lead 53 as the Ei, current signal to lead 43 between switch 44 and resistor 45. Oscilloscope 51 includes a ground connection 46 as illustrated. The ground 46 of circuit 41 is located between sample heater 24 and the current resistor 45 so that the E and Ei signals to the oscillographs have a common ground. Oscilloscope 51 provides a recording interval that corresponds to discharge time with 0–5 and 0–10 milliseconds being employed for the examples of this invention. The oscillogram was photographed by a Land Polaroid camera mounted in front of the screen.

Various arrangements may be utilized to provide a triggering signal for oscilloscope 51. One convenient circuit utilizes a capacitor 54 of 1 microfarad capacity connected by lead 55 from one side of induction choke coil 48 to oscilloscope 51. An additional capacitor 54' of 1 microfarad capacity is connected from the other side of inductance choke coil 48 to ground 40. The sweep triggering signal is thus about that of the voltage drop across inductance choke coil 48. It is understood that many variations of this circuit are also applicable for the intended purpose. For example, more oscilloscopes may be employed or the oscilloscope and its circuitry may be dispensed with when measurements are unnecessary.

The temperature in the reaction vessel may be obtained by calculation or calibration. Temperatures may be correlated to energy insertion in the reaction vessel so that variances in degrees of conversion may be related to the charge of the circuit. Alternately, the temperatures may be predicated on wattage input to the heater tube 37. Tube 37 may be replaced with a nickel wire for example and suitable meters connected thereto for resistance readings. A.C. electrical power is supplied to the reaction vessel to cause melting of the wire and the corresponding point of increase in electrical resistance is noted. This operation is repeated at various pressures so that a watt input versus temperature curve is established. An extrapolation of such a curve will provide a temperature condition based upon wattage input. Alternately, the temperature in the sample may be calculated based upon electrical energy insertion for example in joules, as more particularly described in copending application Serial No. 214,793, Bundy, filed concurrently herewith and assigned to the same assignee as the present invention.

In one exemplary practice of this invention, reaction vessel 20 was assembled with hexagonal boron nitride for the sample, for parts 26, 28, 30, and 31, as illustrated and described with respect to FIG. 2. Apparatus 10 was then positioned between a pair of platens of a 300 ton capacity press so that the platens moved punches 15 and 16 towards each other to compress the reaction vessel 20 to raise the pressure in the hexagonal boron nitride sample to about 130 kilobars, in the region of the iron transition by press calibration. Pressure rise to the iron transition region may be accomplished slowly or rapidly with no change in the final result. Pressure rise may also be incremental or constant. In this exemplary practice, pressure rise was completed in about 3 minutes. Thereafter, circuit 41 was discharged at about 26 volts and 0.085 farad through heater 24.

After reducing the pressure and temperature and removing reaction vessel 20 from the apparatus 10, sample parts 26, 28, 30, and 31 were microscopically examined and found to be polycrystalline containing a great number of very small cubic boron nitride crystallites of a pale yellow color and about 1 micron in longest dimension. Cubic form of boron nitride verification included subjecting the sample to scratch tests, buoyancy tests, and X-ray analysis, which conclusively indicated cubic boron nitride.

The characteristics of cubic boron nitride are described in U.S. Patent 2,947,617 and are the same characteristics of the cubic boron nitride of this invention. Cubic boron nitride, both in this invention and in U.S. Patent 2,947,617, is a cubic crystal configuration analogous to the zinc-blended structure with a unit cell edge of 3.615 angstroms. This cubic boron nitride has a hardness substantially equal to the hardness of diamond and is thermally stable at a temperature as high as about 2000° C. A further reference to cubic boron nitride may be obtained in the "Journal of Chemical Physics," vol. 34, No. 3, pages 809–812, March, 1961.

It should be understood that pressures within the reaction vessel are based upon calibration means as described and the accuracy of any pressure determination is not therefore of a precise nature. Additionally, the pressure at which conversion starts to take place is also not a precise measurement. Representative examples indicate partial conversion of the sample at lower pressures and lower temperatures and more complete conversion at higher pressures and higher temperatures.

Representative examples of the conversion process are given in the following Table 2 for the reaction vessel of FIG. 2 with the capacitor discharge circuit for heating purposes and in Table 3 for the reaction vessel of FIG. 4 with a resistance heating circuit utilizing a 60 cycle A.C. current to heat tube 38 and the sample therein. All wall materials were pyrophyllite. In the practice of this invention the reaction vessels are assembled as described and illustrated, and placed in the apparatus of FIG. 1. The reaction vessel is then subjected to the desired high pressure. After pressure is attained, slow resistance heating is employed (or capacitor circuit 41 is discharged for rapid heating) for a predetermined temperature rise. After a period of about 1–3 minutes, temperature and then pressure is reduced and the sample material recovered. Scratch tests and X-ray analysis provided cubic boron nitride verification. CBN is cubic boron nitride. Conversion was substantially 100%.

Table 2

| Example No. | Pressure, Kilobars | Capacitor Circuit Electrical Energy | | Results |
|---|---|---|---|---|
| | | Volts | Farads | |
| 1 | 150 | 31 | 0.085 | CBN |
| 2 | 120 | 25 | 0.085 | CBN |
| 3 | 140 | 28 | 0.085 | CBN |
| 4 | 140 | 28 | 0.085 | CBN |
| 5* | 140 | 75 | 0.0045 | CBN |

*50/50 Wt. percent BN+Graphite.

In Examples 3 and 4 from Table 2, a high purity boron nitride powder was employed of about 99.8+percent purity. No $B_2O_3$ was present. Conversion was greater than about 50%.

Table 3

| Example No. | Pressure, Kilobars | Watts Input | Temp.° C. Resistance Heating | Duration Heating Time (Min.) | Results |
|---|---|---|---|---|---|
| 1 | 113 | 103 | 1,900 | 1 | CBN |
| 2 | 113 | 130 | 2,500 | 1 | CBN |
| 3 | 100 | 130 | 2,500 | 1 | CBN |
| 4 | 130 | 110 | 2,200 | 1.5 | CBN |
| 5 | 130 | 125 | 2,400 | 1 | CBN |

While the foregoing examples provide cubic boron nitride in all instances, the wurtzite form or structure of boron nitride appears at the lower temperature conditions. The wurtzite form of boron nitride is the subject matter of copending application S.N. 191,782 Bundy et al., filed May 2, 1962, and assigned to the same assignee as the present invention.

From the examples of the above table as well as numerous other examples, it was noted that within the apparatus calibration range, differences in wall materials or reaction vessels do not have an appreciable effect on the pressure attained so that a conversion of hexagonal boron nitride to cubic boron nitride is indicated in the range of about 100–120 kilobars pressure or at least about 100 kilobars. By "at least about" it is intended to include a reasonable variance both above and below the given number. All examples were examined by X-ray analysis to determine the presence of cubic boron nitride.

While all of the above examples are representative of the practice of this invention with one preferred form of apparatus and preferred heating methods, other apparatuses are available and known in the art which provide the given conditions, more particularly, apparatus capable of providing pressures at least about 100 kilobars pressure. Other circuitry or heating methods may be employed, or the flash heating circuit as described in this invention may be altered or changed, the more important requirement being that the heating means will provide the desired temperature concurrent with the pressure conditions utilized.

The practice of this invention also indicates a positive conversion of hexagonal boron nitride to cubic boron nitride with varying temperatures. The effect of temperature rise in a boron nitride sample in the conversion reaction is noted in the resultant sample. For higher temperatures more complete conversion takes place and at the higher temperatures less pressure is required.

The area of operation of pressure and temperature of this invention as well as the different pressures and temperatures employed to provide conversion of boron nitride to the cubic form thereof is best described with relation to FIG. 6. FIG. 6 is an example of a phase diagram of boron nitride with the ordinate as pressure in kilobars and the abscissa as temeprature in degrees Kelvin. Curve E is that previously established equilibrium line which separates the hexagonal boron nitride stable region H from the cubic boron nitride stable region C.

Curve $L_1$ is the melting line of hexagonal boron nitride and curve $L_2$ is the melting line of cubic boron nitride. Lines $L_1$ and $L_2$ define a liquid region L of boron nitride. Curve M is representative of a lower limit of an included area for the practice of this invention, and illustrates those conditions of pressures and temperatures where instantaneous conversion takes place. Curve M is inclusive of an area A defined by border $Th$ of threshold conditions where the reaction of this invention may take place depending on the time available for reaction.

Curve M is established in a twofold manner; first, from the above and numerous other examples performed including melting of boron nitride at high pressures and, second, from knowledge of the development of other material phase diagrams such as for example those of InSb, Si, Ge, and GaSb which are similar. More particularly, the phase diagram of a very similar and cubic material, carbon, has been extended as described in copending application S.N. 214,793 Bundy, assigned to the same assignee as the present invention and filed concurrently herewith. The pertinent portions of the aforementioned copending application are incorporated herewith. Briefly, in the phase diagram of FIG. 6, the various curves correspond to the curves of the phase diagram of carbon from the aforementioned copending application, and the phase diagram is similar in structure. Accordingly, in FIG. 6 the hexagonal boron nitride melting line $L_1$ commences at about 3300° K. and rises upwardly with a positive slope changing to a negative slope to intersect the equilibrium line E at a triple point T near about 3200°–3600° K. and at about 110 kilobars. At this point T curve M rises to intersect the ordinate of the diagram, at 0° Kelvin, the the neighborhood of 300 to 400 kilobars. Further basis for this rise of curve M is the noted occurrence of a reduced temperature rise necessary with the use of higher pressures. Also from point T, curve $L_2$ which is the melting line for cubic boron nitride rises upwardly to what is contemplated to be a further triple point $T_1$ (not shown) at the intersection of a pair of phase lines which define an area, in the 400 to 700 kilobar region, where a metallic form of boron nitride is believed to exist.

The correlation of the findings of this invention to the phase diagrams of similar materials provides an area A of operation for this invention. Area A is immediately preceding curve M and is defined by a threshold curve $Th$ which progresses from triple point T to intersect the ordinate or 0° Kelvin line of the phase diagram. Curve $Th$ is illustrated as a hatched area because the precise point at which conversion takes place has not been determined for line accuracy. Conversion of the hexagonal form of boron nitride to the cubic form of boron nitride by the direct conversion process of this invention takes place above curve $Th$ in the area A depending on the time of reaction, a longer reaction time being indicated in the thicker portion of the area A and a shorter reaction time in the thinner portion of area A. The region above area A (i.e., above curve M) and below (1) the cubic form of boron nitride melting line $L_2$ and (2) the metallic form of boron nitride region, is also included in the general conversion area for the practice of this invention to produce the cubic form of boron nitride. This region is defined by curve M which commences below about 350 kilobars pressure at room temperature to about 100 kilobars at about 3200° K. The practice of this invention above the curve M will provide instantaneous conversion of boron nitride to the cubic form of boron nitride. In the ordinary practice of this invention progression into area A provides conversion to the cubic form of boron nitride. In this direction line M is the limit of the conversion region since it is regarded as the instantaneous melting line for boron nitride and defines an upper region wherein only the cubic form of boron nitride exists.

Investigation of various kinds of boron nitride as starting material indicates that there is a threshold temperature at which the conversion starts or takes place and threshold temperature is a function of the kind of boron nitride employed at a given pressure. In conversion processes as well as in many other kinds of chemical reactions, temperature plays an important role. More specifically reaction rates are dependent on temperature and higher temperatures lead to higher rates. In this invention temperatures also affect the conversion rate and higher temperatures are thus desirable. Threshold temperature is a temperature at a given pressure where the conversion rate is effective to produce a satisfactory quantity of cubic boron nitride in a relatively short period of time, i.e., a measurable and finite quantity of cubic boron nitride is recovered in the time involved. Threshold temperatures differ for different starting materials. Threshold temperature, therefore, is also defined as that temperature in combination with a given pressure and for a particular sample material where atom agitation takes place and the boron nitride is converted to cubic form of boron nitride. Different forms of boron nitride which have been employed in the practice of this invention include molded boron nitride rods having about 2.5% $B_2O_3$, purified boron nitride powder of about 99.8+ percent purity, and pyrolytic boron nitride. It is believed that the conversion process of this invention is initiated by atom agitation, and temperature determines the conversion rate. Threshold temperatures are indicated by curve $Th$ in FIG. 6.

The reaction is differentiated in one respect over the reactions described in the aforementioned Patent 2,947,617 in that no further added catalyst materials are utilized in this invention or are necessary as defined in the aforementioned patent. The essence of this invention, as indicated by innumerable conversions, relates to the feature that boron nitride may be converted to the cubic form of boron nitride by a method consisting essentially of application of high pressures and preferably a temperature rise for the conversion process. Initially the hexagonal boron nitride sample is effectively compressed to a pressure lying above the equilibrium line between hexagonal and cubic boron nitride. The hexagonal boron nitride atoms are thus being compressed to move in a direction in which they tend to move, i.e., into the cubic form of boron nitride. What is additionally needed is believed to be some triggering action, some further means by which atoms in the hexagonal boron nitride crystal are agitated or caused to be moved into the cubic boron nitride crystal lattice. Such action or atom agitation then continues until the conversion or transformation is complete.

Atom agitation for this invention is provided in one form by the direct application of electrical energy to the hexagonal boron nitride sample. This direct application of energy further provides a more direct transition from the hexagonal to the cubic form of boron nitride without the need of any intermediate materials, such as the molten metal of the previously described cubic boron nitride process. Atom agitation is described as the initiating means which initiates the conversion from the hexagonal to the cubic form of boron nitride and may occur as the result of various imposed forces, such as compressive, tensile or shearing forces on a given crystal, or by the application of high frequency in the form of sound waves, or radioactive bombardment. The atom agitation of this invention is related to a conversion process, i.e., the agitation must be sufficient to cause conversion of hexagonal to cubic boron nitride. Furthermore, this agitation must be effective or take place while the hexagonal boron nitride is compressed in the cubic boron nitride stable region of boron nitride, and must act directly on the hexagonal boron nitride. At this point, atom agitation may occur, for example because the pressure is sufficiently high, in area A or above curve M, that various atoms are moved closer together, and/or the hexagonal crystal structure collapses through a form of melting to crystallize in the cubic structure. Curve M is thus an instantaneous melting line for hexagonal boron nitride. At lower pressures where higher temperatures are employed the flash heating circuit provides an energy effect which causes limited or domain or molecular melting for crystallization to the cubic form.

As can be seen by the preceding examples the atom agitation of this invention takes place in one form by the imposition of pressure and temperature on a hexagonal boron nitride sample. Accordingly, pressure may be applied by the well known shock technique, explosive waves, etc. These methods may include an inherent temperature rise for more complete conversion. Atom agitation may be facilitated or caused to take place at lower pressure by means of raising the temperature within a given sample.

One of the salient features of this invention, when utilizing heating, is control. Both temperature and pressure may be individually controlled. For example, practice of this invention may include providing a desired pressure for a given material and changing that pressure for various purposes. Thereafter, the sample may be heated either by discharge or resistance heating depending on degree of charge given to the capacitor circuit or power in watts in the resistance circuit. The pressure rise attributable to quick heating is not considered sufficient to affect the control of pressure for this invention. Thus, pressures and temperatures are independent of each other. A clear implication of this independency is that, with reference to the phase diagram of boron nitride in FIG. 6, pressures are maintained in the cubic boron nitride stable region C during any temperature changes which would cause conversion to hexagonal boron nitride. For the reverse conditions, any cubic boron nitride formed would be reverted to hexagonal boron nitride.

When pressure-temperature conditions are in the cubic boron nitride stable region, pressure must be maintained therein at the desired temperature, because if pressure drops to below the equilibrium line, even though cubic boron nitride is formed, it will revert to hexagonal boron nitride because of the high temperature. Pressures and temperatures must therefore be properly correlated so that given conditions may be established and maintained. Independent control features are thus important elements in the practice of this invention. Additionally, control of pressure includes raising and lowering pressure in any desired increments. Either the pressure or temperature, or both, may be raised in increments, i.e., one or more steps so that the path of change of conditions may approach a given point from any desired direction. Such a point may be reached, therefore, by means of a pressure rise, temperature rise, temperature reduction, pressure reduction, or combinations thereof.

This invention is described with respect to a static pressure apparatus in which hexagonal boron nitride is converted to cubic boron nitride. In such an apparatus the pressure may be applied as the first step and variable and long term delay utilized before temperature is raised. A slow pressure rise is preferred to provide uniform conditions in the various materials. "Slow" is indicative of operation in minutes preferably but includes operation in seconds. Stability of pressure over a reasonable time limit provides more favorable operation and more complete conversion. Static control pressure is differentiated from shock wave pressure because it is a maintained pressure rather than a transient one and because the time rate of change of pressure may be controlled. (One example of a shock or explosive method is described in British Patent 822,363, October 21, 1959.) However, various pressure raising means or combinations of pressure raising means, and various temperature raising means or combinations of temperature raising means may also be employed to practice this invention, the said means being secondary to the feature of this conversion process taking place without a catalyst material.

While pressure may be raised incrementally, in one or more increments, so also temperature rise may be in increments by using an ordinary resistance heating circuit, by delayed thermite reactions, or additionally by raising the temperature to a given value below the threshold temperature and then utilizing capacitor discharge for completion of the temperature rise. Because of these features taken in connection with the control features mentioned, the direction in which temperature conditions move, i.e., from and into the cubic and hexagonal boron nitride stable regions, may be predetermined with greater precision and control. For example, in moving pressure and temperature conditions into the conversion region A or above curve M of the phase diagram of boron nitride, a path may be followed which precludes entry into non-conversion regions. More importantly, the path of return from a conversion region may be closely predetermined and followed. The direction or method of approach into the conversion region may be varied with conversion taking place in the conversion region.

X-ray diffraction patterns indicate only cubic form and wurtzite structure of boron nitride lines, or lines from other known materials, in the cubic or wurtzite form of boron nitride. In other words, these crystals may have predetermined characteristics based on the characteristics of the starting boron nitride. In one respect, the inclusion or added materials in the hexagonal boron nitride remain when conversion to cubic boron nitride takes place. Therefore, the purity of cubic form of boron nitride as obtained in this invention is reflected in the purity of the cubic form of boron nitride. Accordingly, certan materials may be incorporated in the starting boron nitride, one method being, for example doping the starting material with silicon, germanium, selenium, beryllium, etc., to provide semiconducting crystals.

The objects of this invention are thus achieved by employing high pressures and atom agitation means to a boron nitride material for conversion to cubic boron nitride. More specifically, the subjection of a boron nitride material to pressures above from about 110 kilobars at 2000° C. to 300 to 400 kilobars at room temperature causes direct conversion of hexagonal to cubic boron nitride.

Cubic boron nitride obtained by means of this invention is widely applicable for industrial purposes in the same manner as natural diamonds, for example, as abrading or cutting material. In this respect, various bonding or electrical conducting agents such as metals for example may be mixed with boron nitride as the starting material for electrical conducting properties when using the FIG. 2 reaction vessel. In this respect, it is to be noted that as in application S.N. 191,914—Bundy, filed May 2, 1962 (now abandoned), incorporated herewith, the primary reason for using the capacitor discharge type of heating is to provide the higher temperatures at higher pressures before any extensive melting or decomposition takes place. In the FIG. 2 reaction vessel, the conversion takes place in the boron nitride next adjacent heater 32, or in heater 32 when BN is incorporated therein. Thus, the metal walls of the apparatus are not subjected to extreme and injurious temperatures. Where other reaction vessel wall materials, such as pyrophyllite, are employed, conversion takes place in the sample before any extensive melting therein takes place.

While a specific method and apparatus in accordance with this invention is described and shown, it is not intended that the invention be limited to the particular description nor to the particular configurations illustrated, and it is intended by the appended claims to cover all modifications within the spirit and scope of this invention.

What I claim as new and desire to secure by Letters Patent of the United States is:

1. A method for converting hexagonal boron nitride in the absence of a catalyst to a crystalline substance substantially equal in hardness to the hardness of diamond which comprises the steps of:
(a) preparing a specimen consisting essentially of hexagonal boron nitride,
(b) subjecting said specimen to simultaneous pressure and temperature conditions in the region above the lower limits of the curve Th of the graph of FIG. 6 for a period of at least about 1 minute,
  (1) said pressure being statically applied and having a value of at least about 100 kilobars,
  (2) said temperature having a maximum value of about 3600° K.,
(c) permitting said specimen to return to ambient atmospheric conditions, and
(d) separating the boron nitride crystals of increased hardness from any unconverted hexagonal boron nitride.

2. A method for the conversion in the absence of a catalyst of hexagonal boron nitride to cubic boron nitride comprising the steps of:
(a) preparing a specimen consisting essentially of hexagonal boron nitride,
(b) subjecting said specimen to simultaneous pressure and temperature conditions in the region above line M on the graph of FIG. 6,
  (1) said pressure being static and having a value of at least about 100 kilobars,
  (2) said temperature having a maximum value of about 3600° K.,
(c) permitting said specimen to return to ambient atmospheric conditions, and
(d) separating the cubic boron nitride crystals from any unconverted hexagonal boron nitride.

3. A method for making in the absence of a catalyst a crystalline boron nitride substance substantially equal in hardness to the hardness of diamond which comprises the steps of:
(a) preparing a specimen consisting essentially of material for yielding boron and nitrogen at elevated pressures,
(b) subjecting said specimen to simultaneous pressure and temperature conditions above the lower limits of curve Th of the graph of FIG. 6 for a period of at least about 1 minute,
  (1) said pressure being static and having a value of at least about 100 kilobars,
  (2) said temperature having a maximum value of about 3600° K.,
(c) permitting said specimen to return to ambient atmospheric conditions, and
(d) recovering the boron nitride crystalline substance substantially equal in hardness to the hardness of diamond.

References Cited by the Examiner

UNITED STATES PATENTS

| | | | |
|---|---|---|---|
| 2,801,903 | 8/57 | Fetterly et al. | 23—191 |
| 2,808,314 | 10/57 | Taylor | 23—191 |
| 2,832,672 | 4/58 | Fetterly | 23—191 |
| 2,947,617 | 8/60 | Wentorf | 23—191 X |

FOREIGN PATENTS 860,499  2/61  Great Britain.

MAURICE A. BRINDISI, *Primary Examiner.*